United States Patent [19]

Shimoiizaka et al.

[11] 4,084,755
[45] Apr. 18, 1978

[54] METHOD AND APPARATUS FOR BREAKING UP AND SEPARATING WASTE GLASS TO OBTAIN CULLET

[75] Inventors: Junzo Shimoiizaka, 1-1-14-803 Komegabukuro, Sendai, Japan; Akira Konosu, Sendai, Japan; Yuzo Hayashi, Sendai, Japan; Kaneji Morita, Nishinomiya, Japan; Akio Sugie, Nishinomiya, Japan; Kunio Ishioka, Kobe, Japan

[73] Assignees: Junzo Shimoiizaka; Yawamura Glass Kabushiki Kaisha, both of Japan

[21] Appl. No.: 724,532

[22] Filed: Sep. 20, 1976

[30] Foreign Application Priority Data

Sep. 22, 1975  Japan ................................ 50-115396

[51] Int. Cl.² ............................................. B02C 19/00
[52] U.S. Cl. ..................................... 241/95; 241/96; 241/274; 241/284
[58] Field of Search ................... 241/5, 24, 29, 30, 83, 241/91, 95, 96, 274, 278 A, 284

[56] References Cited

U.S. PATENT DOCUMENTS

| | | |
|---|---|---|
| 772,377 | 10/1904 | Rowland et al. ..................... 241/274 |
| 2,820,595 | 1/1958 | Schumacher ........................ 241/99 |
| 3,491,958 | 1/1970 | Zucchini ............................. 241/91 |
| 3,614,003 | 10/1971 | Tremolada .......................... 241/284 |
| 3,946,953 | 3/1976 | Hato .................................... 241/99 |

*Primary Examiner*—Granville Y. Custer, Jr.
*Attorney, Agent, or Firm*—Holman & Stern

[57] ABSTRACT

Waste glass containing three-dimensional extraneous matter to be removed is dropped onto a grizzly and is thereby broken up by gravity and separated into an undersize portion containing planar fragments of waste glass and of extraneous matter and an oversize portion containing three-dimensional large pieces of waste glass and unbreakable extraneous matter, the grizzly comprising parallel bars arranged at a spacing smaller than the minimum width of projection of the three-dimensional extraneous matter. The oversize portion is repeatedly subjected to the same procedure as above to break up the waste glass to an undersize material within a specified range of sizes and to remove the three-dimensional extraneous matter from the waste glass. A breaking and separating apparatus comprises grizzlies arranged in multi-stage fashion within a passage for dropping the waste glass or a rotatable drum-shaped grizzly having scraping plates.

1 Claim, 19 Drawing Figures

METHOD AND APPARATUS FOR BREAKING UP AND SEPARATING WASTE GLASS TO OBTAIN CULLET

BACKGROUND OF THE INVENTION

The present invention relates to a method and apparatus for breaking up and separating waste glass for the reuse of the waste glass as a regenerated material, namely as cullet.

Recycled waste glass contains aluminum, iron, synthetic resin, cork and like caps for glass bottles. Waste glass may further contain empty cans of aluminum, iron and other materials. When such waste glass is used as cullet, the glass product obtained contains bubbles and unmelted substances, i.e. so-called "stones," and involves changes in color or refinement due to the presence of various kinds of extraneous matter. These objections reduce the strength and appearance of the product, seriously impairing the commercial value of the product.

Accordingly the extraneous matter must be removed to the greatest possible extent. However, the extraneous matter varies greatly in shape and properties. Moreover, regardless of whether the waste glass has been fractured or not, some kinds of extraneous matter may not differ from the waste glass in shape, size or specific gravity. Thus the undesirable matter is not readily separable by the conventional methods such as screening, washing with water, sink and float separation, etc., with the exception of magnetic materials which are magnetically separable. In fact the conventional methods give very low yields.

Figure 1:
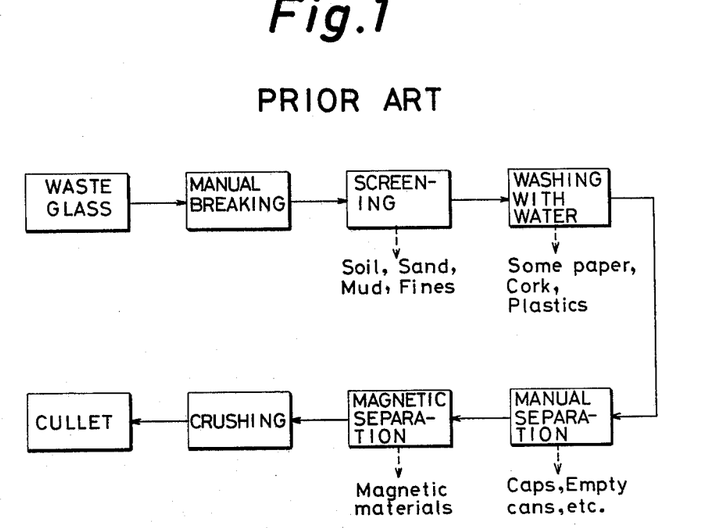
FIG. 1 is a flow chart illustrating a conventional process for preparing cullet from waste glass.

FIG. 1 is a flow chart showing a conventional process generally practiced for removing extraneous matter from waste glass. With this process, recycled waste glass is first manually roughly broken in order to fracture glass articles which are almost in complete shape and which are contained in the waste in a relatively large number. The broken pieces of glass are then screened and washed with water to remove soil, mud, sand and some paper, cork and plastics. Subsequently the other remaining extraneous pieces and articles such as metal caps and empty cans are manually separated for removal. Undesired magnetic materials are thereafter removed by magnetic separation.

The step of manual separation is indispensable because the extraneous matter other than magnetic materials is difficult to automatically remove. Since the difference in true specific gravity between glass and aluminum is very small and since empty cans, aluminum caps and like pieces engage or embrace pieces of glass and contain air during the breaking step, large quantities of empty cans, caps etc. remaining in the waste glass obtained after washing with water or sink and float separation are cumbersome to manually separate off.

The waste glass separated from the extraneous matter is then crushed to obtain pieces of cullet having sizes in a specified range. Unlike the manual breaking step intended for the removal of extraneous matter, the waste glass must be wholly crushed to a range of effective sizes, e.g. −44 mm to +6.7 mm. In view of efficiency and ease, ore and stone crushers such as jaw crushers and impeller breakers are generally used for this purpose. However, the operation with use of such crushers tends to cause abrasion and compression, consequently breaking up the material excessively to sizes smaller than the desired sizes and yielding a very large amount of fine particles. The cullet obtained will then markedly bubble up when melted in a furnace. In the case where the crushed material is further fed to an optical separator for color separation in order to obtain good cullet, the excessively crushed portion will not be separable depending on the type of the device used, and satisfactory cullet will not be available.

SUMMARY OF THE INVENTION

The main object of this invention is to make it possible to break up waste glass to a desired range of sizes without excessive breaking and to almost completely remove caps, empty cans and like extraneous matter by the breaking operation.

More specifically the object of this invention is to provide a method and apparatus for preparing cullet from waste glass by breaking up the brittle waste glass into planar pieces of glass while permitting unbreakable caps and empty cans to retain their three-dimensional shape despite the breaking operation so as to separate the waste glass into the planar pieces and the three-dimensional extraneous matter.

Our experiments have revealed the following. First, when waste glass is dropped and thereby spontaneously broken up under gravity, capped mouths of glass bottles are not broken due to the cushioning effect afforded by the mouth covering caps. Moreover, even individually separate aluminum caps and like collapsible articles are not readily collapsible because they are lightweight and resilient and fall at reduced velocity by virtue of their shape. On the other hand, large pieces of brittle glass are easily breakable by the gravitational impact, whereas small glass pieces are less breakable due to the small energy of gravitational impact. Second, when waste glass is spontaneously broken by being dropped onto a grizzly comprising parallel bars which are arranged at a specified spacing, the grizzly retains lumpy or three-dimensional pieces and articles thereon while readily permitting passage of plate-like or planar pieces therethrough. When this breaking procedure is repeated so as to break up the waste glass wholly to the desired sizes, even thick pieces such as bottle bottoms pass through the grizzly with ease because of their flat shape, although such thick pieces themselves are not readily breakable and tend to excessively break up other glass pieces and progressively collapse aluminum caps and the like. Thin pieces are merely broken into flat fragments and pass through the grizzly and are therefore unlikely to be broken up to excess.

Based on these novel findings, this invention has been accomplished. The invention provides a method of breaking up and separating waste glass to obtain cullet which method is characterized by dropping the waste glass containing three-dimensional extraneous matter onto a grizzly to break up the waste glass under gravity and to separate the waste glass into an undersize portion containing planar fragments of waste glass and of extraneous matter and an oversize portion containing three-dimensional large pieces of waste glass and unbreakable extraneous matter, the grizzly comprising parallel bars arranged at a spacing smaller than the minimum width of projection of the three-dimensional extraneous matter, and repeatedly subjecting the oversize portion to the aforesaid breaking operation to reduce the waste glass to an undersize material and to remove the three-dimensional extraneous matter from the waste glass. To practice this method, grizzlies are arranged in a multi-stage fashion within a passage for dropping the waste glass.

With this invention, waste glass is spontaneously broken by being dropped onto a grizzly which permits passage of glass pieces and like planar pieces and which retains empty cans and like three-dimensional articles thereon, whereby the waste glass is separated into an undersize portion and an oversize portion. Relatively large glass pieces pass through the grizzly without being subjected to a substantial breaking action, whereas very large glass pieces which are not passable pass through the grizzly upon being effectively broken up by great energy of impact in proportion to the mass and by the resulting great concentrated stress. On the other hand, small glass pieces readily pass through the grizzly and are relatively free of breaking because of small energy of impact. Thus the operation recovers the waste glass within a narrow range of the desired sizes in a high yield and with high efficiency. Because extraneous pieces and articles are not brittle, they remain unbroken. Furthermore because they are lightweight, they are relatively free of deformation. Thus the grizzly removes the extraneous matter effectively, permitting only a small amount of extraneous matter to remain in the final product. The extraneous matter is in the form of individually separate pieces without engaging glass and is therefore readily separable by sink and float separation or by magnetic separation and manual separation. The fact that no glass pieces are discarded along with some extraneous pieces or articles further improves the yield. Accordingly the present method gives excellent cullet in high yield and with high efficiency by a very simple procedure.

The present invention further provides an apparatus comprising a drum-shaped grizzly having scraper plates on its inner peripheral surface and continuously rotatable. The waste glass fed to the drum-shaped grizzly from its one end is continuously subjected to the foregoing breaking and separating operation with desired frequency, with the remaining portion discharged from the other end. Thus the operation can be carried out with use of only one compact grizzly.

When the drum-shaped grizzly is installed in an inclined position or is in the form of a tapered drum, the remaining portion can be smoothly run off.

The other features of this invention will become more apparent from the following description with reference to the accompanying drawings.

DESCRIPTION OF THE PREFERRED EMBODIMENTS

The experiments conducted according to this invention will be described below. Experiment 1

The test material used was 11.4 kg of waste glass consisting of 99.42% by weight of bottle glass and sheet glass and 0.58% by weight (66.1 g) of extraneous matter including aluminum caps (20 caps). A grizzly 2 comprising 12 mm square iron bars 1 arranged in parallel at a spacing of 22 mm was installed as inclined at 25° in the longitudinal direction of the parallel bars (see FIG. 2). The test material was dropped onto the grizzly 2 from a level 600 mm thereabove and thereby separated into one portion passing through the grizzly 2 and the other portion not passing through the grizzly. The oversize portion alone was dropped onto the grizzly 2 again. Thus the same procedure was repeated 10 times. The resulting undersize material was screened. Table 1 shows the size distribution of the undersize material thus determined and the amount of the extraneous matter contained therein, in comparison with those of the starting test material. The extraneous matter in the undersize material was plate-like aluminum rings having small widths.

Table 1

| Size of glass pieces (mm) | Size destribution (wt.%) | | | | | |
|---|---|---|---|---|---|---|
| | Test material | | Undersize material | | After treatment of +44 mm portion | |
| | Whole | Extraneous matter | Whole | Extraneous matter | Whole | Extraneous matter |
| +44 | 21.4 | 0.12 | — | — | — | — |
| −44 to +22 | 44.9 | 0.46 | 45.2 | 0.0028 | 45.6 | 0.0028 |
| −22 to +11 | 26.3 | — | 42.0 | — | 44.6 | — |
| −11 to +6.7 | 4.7 | — | 6.4 | — | 6.5 | — |
| −6.7 | 2.7 | — | 3.2 | — | 3.3 | — |
| Total% | 100 | 0.58 | 100 | 0.0028 | 100 | 0.0028 |

Table 1-continued

| Size of glass pieces (mm) | Size destribution (wt.%) | | | | | |
|---|---|---|---|---|---|---|
| | Test material | | Undersize material | | After treatment of +44 mm portion | |
| | Whole | Extraneous matter | Whole | Extraneous matter | Whole | Extraneous matter |
| (kg) | (11.4) | (0.0661) | (10.9) | (0.0003) | (10.9) | (0.0003) |

Figure 2:
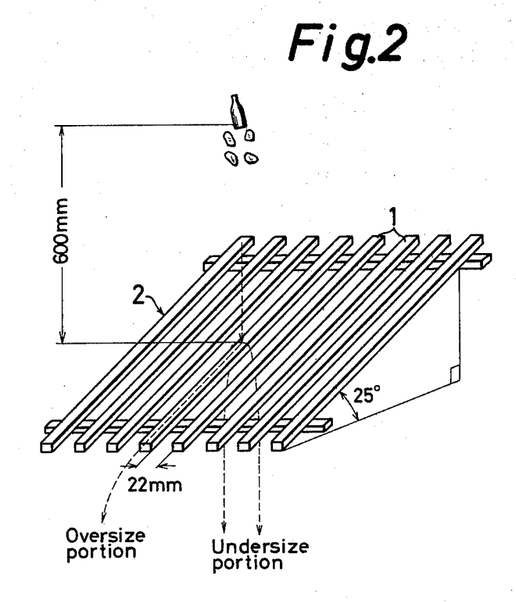
FIG. 2 is a view illustrating the experiments conducted according to this invention.

Table 2 shows the relation between the frequency of dropping of the material onto the grizzly 2 and the combined amount of the accumulated portions of the material passing through the grizzly.

Table 2

| Frequency of dropping | 0 | 1 | 3 | 5 | 7 | 10 |
|---|---|---|---|---|---|---|
| Combined amount of undersize portions (wt.%) | — | 44.9 | 76.9 | 90.9 | 93.9 | 95.2 |

In order to recover the greatest possible amount of waste glass pieces in the desired sizes of −44 to +6.7 mm which are preferably for ensuring optical color separation and avoiding bubbling in the furnace, the +44 mm portion was separated from the undersize material by screening and was then dropped onto the grizzly 2 repeatedly (i.e. 3 times) until the +44 mm portion was wholly broken up to −44 mm. The resulting minus portion was combined with the other undersize material. Table 1 also shows the size distribution of the combined undersize material and the amount of the extraneous matter therein. It is seen that the undersize material was reduced to a maximum of −44 mm without entailing hardly any increase in the amount of excessively broken portion, with the amount of extraneous matter unchanged.

The −6.7 mm portion was separated off by screening to obtain a final product having the desired sizes of −44 to +6.7 mm. The amount of the extraneous matter in the final product is {0.0028/(100 − 3.3)} × 100 = 0.0029 wt.%.

The amount of the glass recovered is 0.952 × {1 − (0.033 + 0.000028)}/0.9942 × 100 = 92.6 wt.%.

The amount of the extraneous matter removed is {(0.58 − 0.0029)/0.58} × 100 = 99.5 wt.%.

Experiment 2

In the same manner as in Experiment 1, a final product was obtained from 15.28 kg of waste glass consisting of 99.09% by weight of bottle glass and sheet glass and 0.91% by weight (139.0 g) of extraneous matter (21 aluminum caps, 4 synthetic resin caps and 2 cork caps). Table 3 shows the size distribution and extraneous matter content of the undersize material obtained after dropping the test material 10 times onto the grizzly, those of the combined undersize material obtained after treating the resulting +44 mm portion and those of the starting test material. The extraneous matter in the undersize material was found to be plate-like aluminum rings having small widths and fragments of synthetic resin.

Table 3

| Size of glass pieces (mm) | Size distribution(wt.%) | | | | | |
|---|---|---|---|---|---|---|
| | Test material | | Undersize material | | After treatment of +44 mm portion | |
| | Whole | Extraneous matter | Whole | Extraneous matter | Whole | Extraneous matter |
| +44 | 24.4 | 0.16 | 6.3 | — | — | — |
| −44 to +22 | 44.6 | 0.75 | 46.3 | 0.009 | 47.2 | 0.009 |
| −22 to +11 | 21.3 | — | 33.5 | 0.011 | 36.0 | 0.011 |
| −11 to +6.7 | 5.7 | — | 8.8 | — | 10.9 | — |
| −6.7 | 4.0 | — | 5.1 | — | 5.9 | — |
| Total% | 100 | 0.91 | 100 | 0.02 | 100 | 0.02 |
| (kg) | (15.28) | (0.1390) | (14.06) | (0.0028) | (14.06) | (0.0028) |

The combined amount of the undersize portions obtained by dropping the test material 10 times was 92.0% by weight. The amount of the extraneous matter contained in the final product having sizes of −44 to +6.7 mm separated from the −6.7 mm portion is {0.02/(100 − 5.9)} × 100 = 0.021 wt.%.

The amount of the glass recovered is 0.92 × {1 − (0.0059 + 0.0002)}/0.9909 × 100 = 87.4 wt.%.

The amount of the extraneous matter removed is

{0.91 − 0.021)/0.91} × 100 = 98.0 wt.%.

Experiment 3

The test material used was 12.50 kg of waste glass consisting of 69.60% by weight of bottle glass and sheet glass and 30.4% by weight of extraneous matter (including 0.4% by weight of caps, 24.75% by weight of metal cans, 5.2% by weight of synthetic resin containers, and 0.05% by weight of pull-top pieces having an opening knob and a cutout portion integral with the knob). The grizzly used had the same construction as one used in Experiment 1 except that the spacing between the parallel bars 1 was 44 mm in view of the fact that the minimum width of projection of the cans was at least 50 mm and that some cans were slightly collapsed. The same breaking procedure as in Experiment 1 was repeated 10 times. The portion not passing through the grizzly included all the metal cans and a majority of the synthetic resin containers. (Tinplate cans were easily separable by magnetic separation.) The portion passing through the grizzly contained the whole of the bottle and sheet glass, the planar pull-top pieces, synthetic resin containers having a minimum width of projection of up to 44 mm and fragments thereof.

The same breaking procedure as in Experiment 1 was repeated 10 times for the undersize portion with use of the same grizzly 2 as used in Experiment 1 and having a bar-to-bar spacing of 22 mm. The +44 mm portion of the resulting undersize material was further subjected to breaking procedure and thereby wholly broken up to −44 mm.

Table 4 shows the size distribution and extraneous matter content of the undersize material obtained by the first treatment with the grizzly having a 44 mm spacing, those of the undersize material obtained by the second treatment with the grizzly having a 22 mm spacing and those of the combined undersize material resulting from the treatment of the +44 mm portion. The extraneous matter contained in the material passing through the grizzly with a 22 mm spacing was found to be plate-like aluminum rings having small widths, pull-top pieces and fragments of synthetic resin.

Table 4

| Size of glass pieces (mm) | 1st Treatment Whole | 1st Treatment Extraneous | 2nd Treatment Whole | 2nd Treatment Extraneous | After treatment of +44 mm portion Whole | After treatment of +44 mm portion Extraneous |
| --- | --- | --- | --- | --- | --- | --- |
| +44 | 15.5 | 0.15 | 2.1 | — | — | — |
| −44 to +22 | 40.8 | 1.53 | 43.3 | 0.06 | 43.5 | 0.06 |
| −22 to +11 | 36.3 | 0.07 | 44.8 | 0.08 | 45.0 | 0.08 |
| −11 to +6.7 | 4.5 | — | 5.3 | — | 6.9 | — |
| −6.7 | 2.9 | — | 4.5 | — | 4.6 | — |
| Total% (kg) | 100 (8.86) | 1.75 (0.1552) | 100 (7.96) | 0.14 (0.0111) | 100 (7.96) | 0.14 (0.0111) |

The combined amount of the undersize portions obtained by the first treatment is 70.9% by weight. The undersize material resulting from the first treatment contains 1.75% by weight of extraneous matter. The combined amount of the undersize material obtained after the treatment of the +44 mm portion is 89.8% by weight based on the amount of the undersize material resulting from the first treatment.

The −6.7 mm portion was separated off by screening to obtain a final product having sizes of −44 to +6.7 mm. The amount of the extraneous matter contained in the final product is $$\{0.14/(100 - 4.6)\} \times 100 = 0.15 \text{ wt.\%}.$$

The amount of the glass recovered is $$0.7084 \times 0.898 \times \{1 - (0.046 + 0.0014)\}/69.6 \times 100 = 87.1 \text{ wt.\%}.$$

The amount of the extraneous matter removed is $$\{3800 - 11.1/3800\} \times 100 = 99.7 \text{ wt.\%}.$$

Experiment 4

In comparison with Experiments 1 to 3 according to this invention, another experiment was conducted with use of 2.86 kg of waste glass consisting of 99.36% by weight of bottle glass and sheet glass and 0.64% by weight (0.018 kg) of extraneous matter (including 7 aluminum caps). The waste glass was broken up in a Los Angeles tester shown in FIG. 3 and comprising a cylinder 3 and a scraper plate 4 attached to the cylinder 3. The waste glass was repeatedly broken while −22 mm portions were withdrawn in succession to finally obtain cullet in a certain range of sizes. The cylinder 3 was driven at 30 rpm, while the effective height the test material was dropped after having been raised by the scraper plate 4 was about 530 mm.

Figure 3:
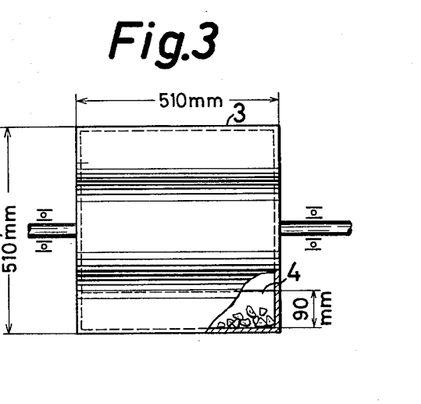
FIG. 3 is a view illustrating an experiment conducted in comparison with the experiments of this invention.

More specifically stated, the test material was placed in the cylinder 3 and dropped 5 times, and a −22 mm portion was withdrawn. The remaining +22 mm portion was dropped again 5 times, and the resulting −22 mm portion was thereafter withdrawn. Thus this procedure was repeated to withdraw −22 mm portions until the material was dropped 30 times. Table 5 shows the size distribution and extraneous matter content of the resulting broken product in comparison with those of the test material.

Table 5

| Size of glass pieces (mm) | Test material Whole | Test material Extraneous matter | Broken product Whole | Broken product Extraneous matter |
| --- | --- | --- | --- | --- |
| +44 | 21.2 | 0.12 | — | — |
| −44 to +22 | 44.8 | 0.52 | 12.2 | 0.625 |
| −22 to +11 | 26.2 | — | 64.3 | 0.015 |
| −11 to +6.7 | 5.0 | — | 13.1 | — |
| −6.7 | 2.8 | — | 10.4 | — |
| Total% (kg) | 100 (2.86) | 0.64 (0.0183) | 100 (2.86) | 0.64 (0.0183) |

The −44 mm to +22 mm portion of the product was discarded because it contained a large amount of extraneous matter, and the −6.7 mm portion was removed because the pieces had too small sizes, whereby cullet was obtained. The amount of the glass recovered is $$(64.3 + 13.1 - 0.015)/0.9936 = 77.9 \text{ wt.\%}.$$

The amount of the extraneous matter contained in the cullet is $$0.015/(64.3 + 13.1) \times 100 = 0.019 \text{ wt.\%}.$$

The amount of the extraneous matter removed is $$\{(0.64 - 0.019)/0.64\} \times 100 = 97.7 \text{ wt.\%}.$$

When the −44 mm to +22 mm portion was combined with the cullet to recover a greater amount of the glass, the amount of the glass recovered is $$(12.2 + 64.3 + 13.1 - 0.625)/0.9936 = 89.55 \text{ wt.\%}.$$

The amount of the extraneous matter contained in the cullet is $$0.64/(12.2 + 64.3 + 13.1) \times 100 = 0.71 \text{ wt.\%}.$$

The amount of the extraneous matter removed is $$\{(0.64 - 0.64)/0.64\} \times 100 = 0 \text{ wt.\%}.$$

Comparison between Experiments 1 to 3 and Experiment 4 reveals the following. Because of the difference between the planar shape of glass pieces and the three-dimensional shape of caps and cans, a grizzly whose bar-to-bar spacing is greater than the minimum width of projection of glass pieces and smaller than the minimum width of projection of caps and cans permits passage of glass pieces even if the sizes of the pieces determined by screening are greater than the spacing, while retaining the caps and cans as oversize pieces. Experiments 1 to 3 show that nearly 50% of the material passing through the grizzly with a bar-to-bar spacing of 22 mm is +22 mm in size and contains a relatively small amount of an excessively broken portion. Accordingly the grizzly achieves a high rate of recovery and has a great treating capacity. Moreover, the extraneous matter contained in the final product has been separated as pieces of such matter free from glass and is readily removable by sink and float separation, etc. The undersize material contains a greatly reduced amount of extraneous matter which is removable even manually.

In contrast, when it is attempted to remove extraneous matter by the usual screening operation as in the case of Experiment 4, there arises the necessity of breaking up glass pieces to sizes smaller than the mesh size of the screen which does not pass the extraneous matter. Consequently the screening operation requires a prolonged detention time, gives a large amount of fines and permits the extraneous matter to deform and engage glass pieces, preventing separation of such matter as individual pieces. Thus the glass attached to the undesirable pieces must be discarded therewith, leading to extremely low rate of recovery of glass. Moreover, the screening device has a low capacity. If it is attempted to recover the glass material in the sizes of −44 to +6.7 mm to thereby achieve a glass recovery rate that is as high as those in Experiments 1 to 3, the extraneous matter content of the recovered material is more than 4 times those of Experiments 1 to 3, involving difficulties in removing the undesired matter.

As already stated, the energy of gravitational impact is in proportion to the mass of the falling matter. Thus throughout Experiments 1 to 4, the smaller the glass pieces, the less likely it is for them to be broken up. Since the waste glass is dropped onto the grizzly in Experiments 1 to 3, there is a reduced tendency for small glass pieces to be broken by the gravitational impact. Moreover, because of the planar shape, even large glass pieces can pass through the grizzly, so that excessive breaking can be effectively avoided unlike Experiment 4. Furthermore upon striking against the grizzly, pieces of waste glass are subjected to concentric stress and thereby broken into fragments involving a narrow range of size distribution, i.e. reduced variations in size.

Figure 4:
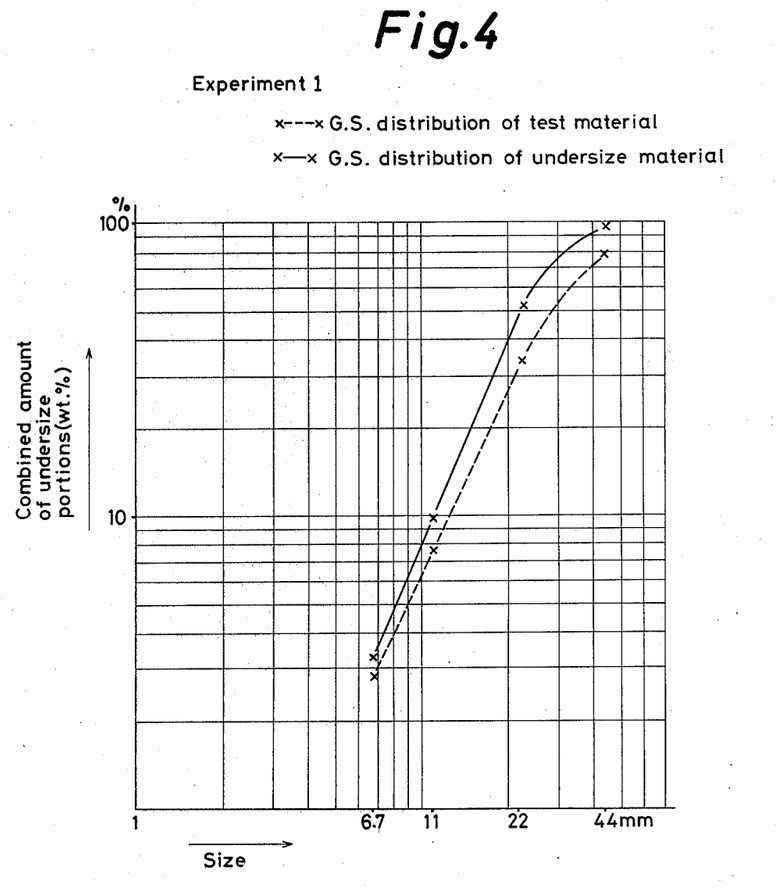
FIGS. 4 to 6 are graphs each showing the G.S. distribution of the waste glass test material used in each experiment of this invention in comparison with that of the undersize material obtained in the experiment.
Figure 5:
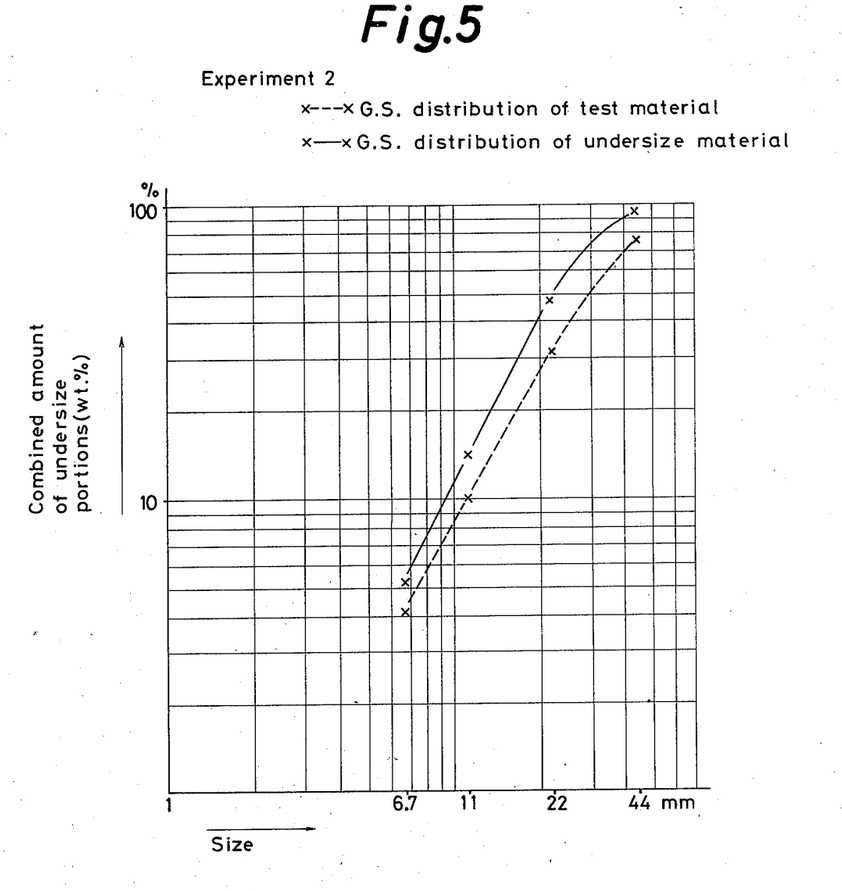
Figure 6:
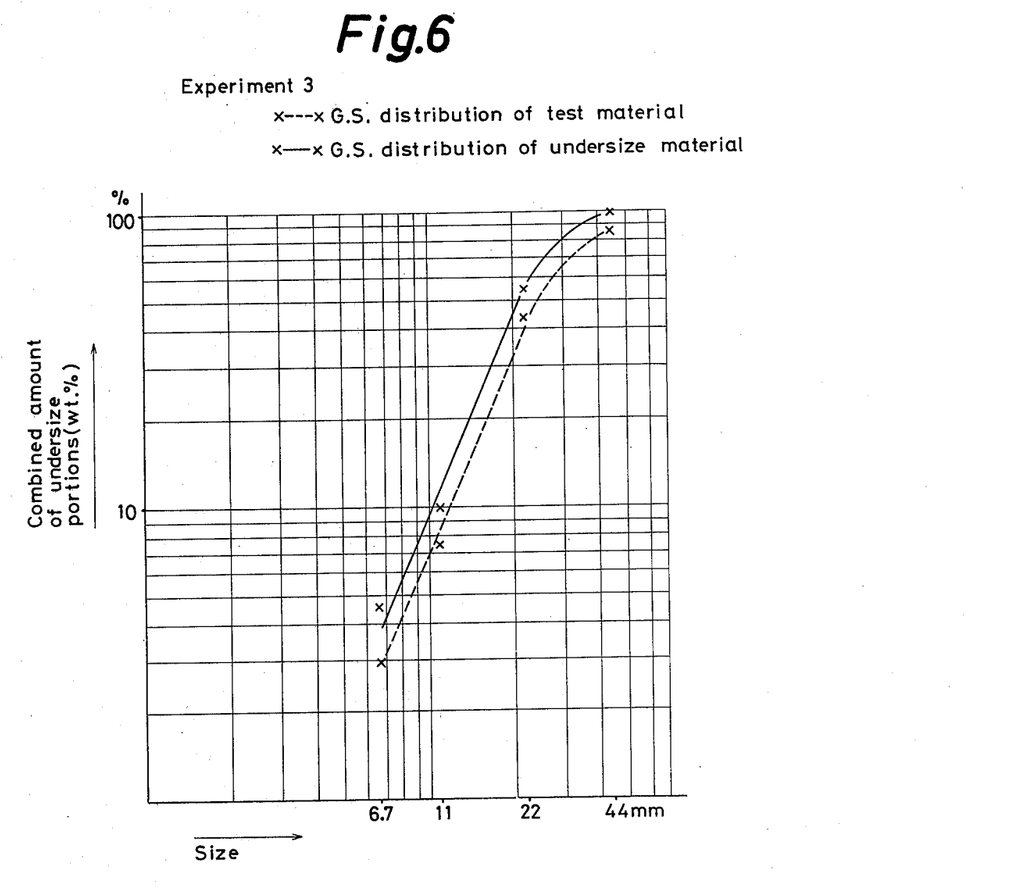
Figure 7:
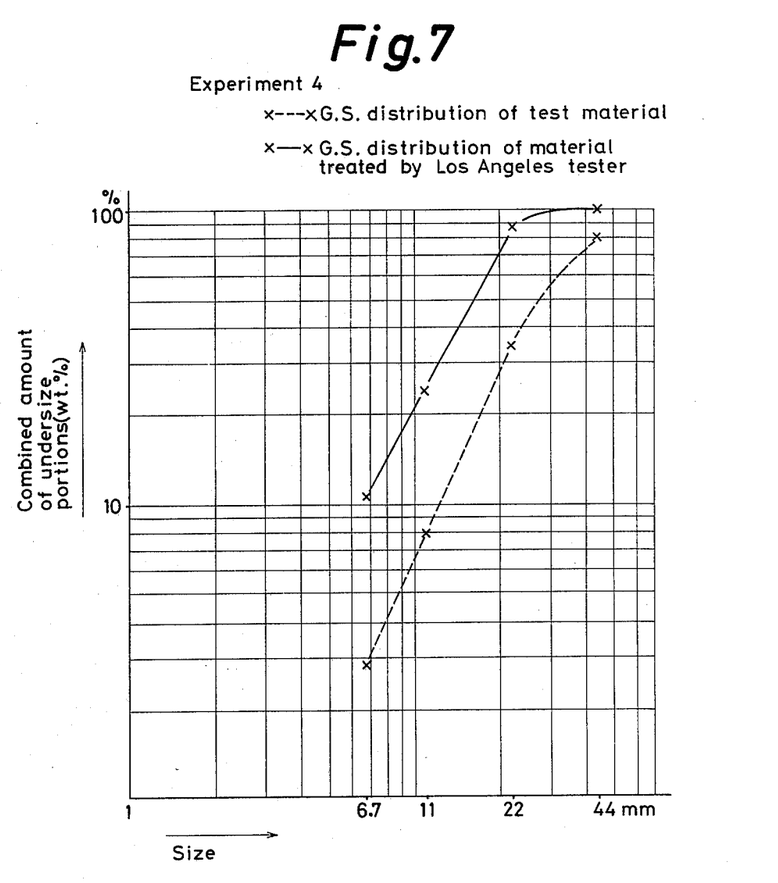
FIG. 7 is a similar graph showing the G.S. distribution of the waste glass test material used in the comparison experiment illustrated in FIG. 3 and that of the undersize material obtained in the experiment.

For these reasons, outstanding results were achieved in Experiments 1 to 3. FIGS. 4 to 7 show the results of Experiments 1 to 4 in terms of the so-called Gaudin-Shuhman distribution, namely the characteristic relation between the size of glass pieces and the combined amount (wt.%) of the undersize portions. In each of FIGS. 4 to 6 representing the results of Experiments 1 to 3, the straight line portion of the curve representing the G.S. distribution of the undersize material is steeper than the corresponding line portion representing the starting material, unlike FIG. 7 showing the result of Experiment 4. This reveals that the present method is effective in breaking up waste glass into pieces within a reduced range of sizes since the undersize material contains a reduced amount of small pieces.

The apparatus for practicing the present method will be described below. Throughout the embodiments illustrated in the drawings, like parts are referred to by like reference numerals.

Figure 8:
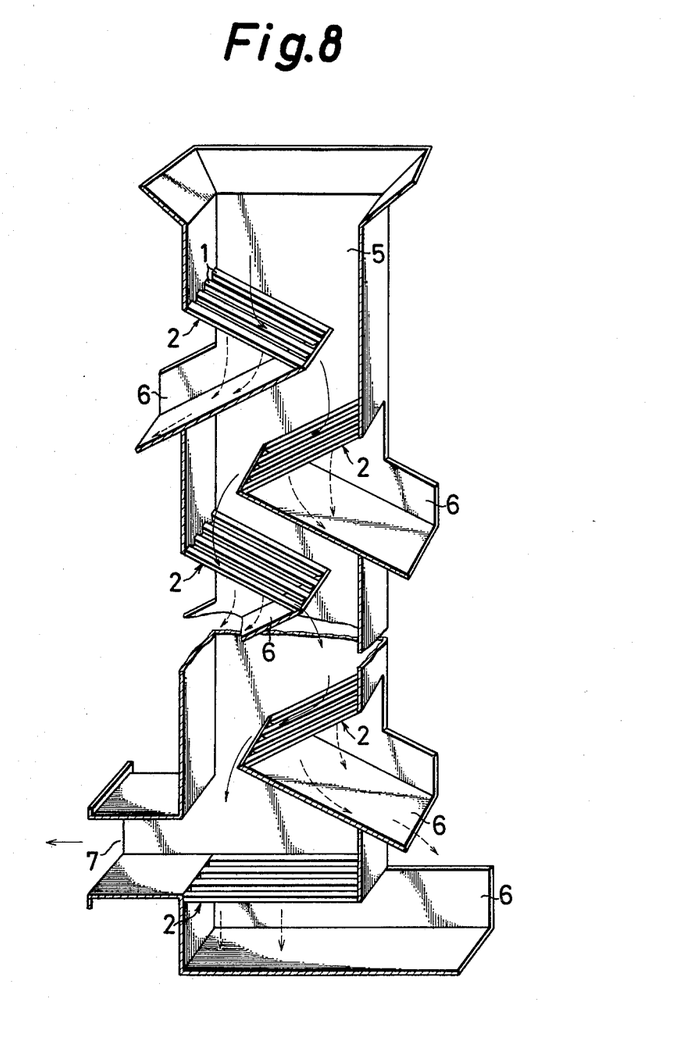
FIG. 8 is a perspective view in vertical section showing an embodiment of the apparatus of this invention including planar grizzlies arranged in a multi-stage fashion within a passage for dropping waste glass.

FIG. 8 shows an embodiment including grizzlies 2 extending into a dropping passage 5 for waste glass alternately from the opposite sides of the passage in a multi-stage fashion and inclined at a specified angle, such that only the portion of waste glass retained on one grizzly 2 is dropped onto the next lower grizzly 2. A number of grizzlies 2 required for the desired final product are provided. Some grizzlies 2 may have a bar-to-bar spacing which differs from the spacing of the other grizzlies. Under each of the grizzlies 2, there is provided an outlet 6 for discharging an undersize portion separated from an oversize portion. The lowermost grizzly 2 is continuous with an outlet 7 for discharging the resulting oversize material.

Figure 9:
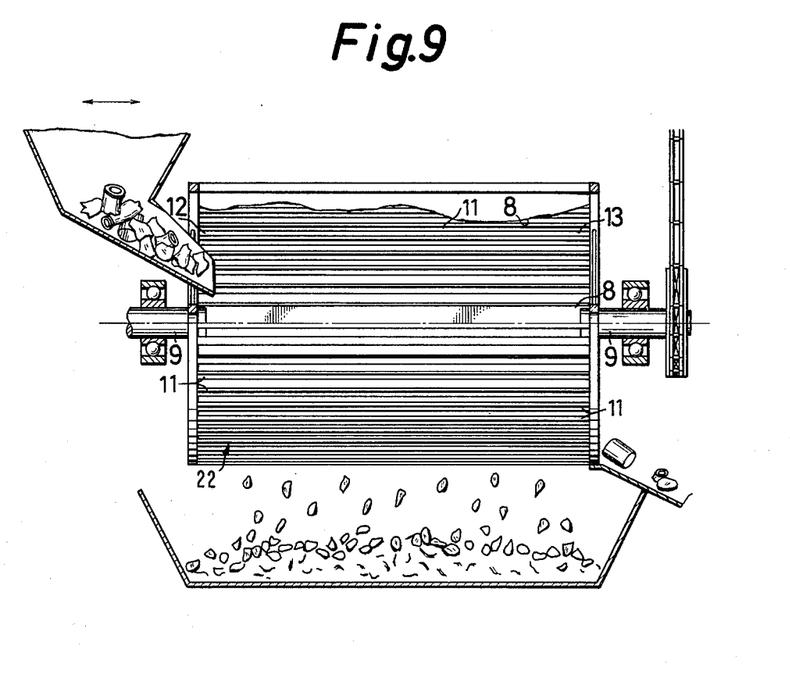
FIG. 9 is a side elevation partly in section showing another embodiment of this invention including a grizzly of the rotatable drum type.
Figure 10:
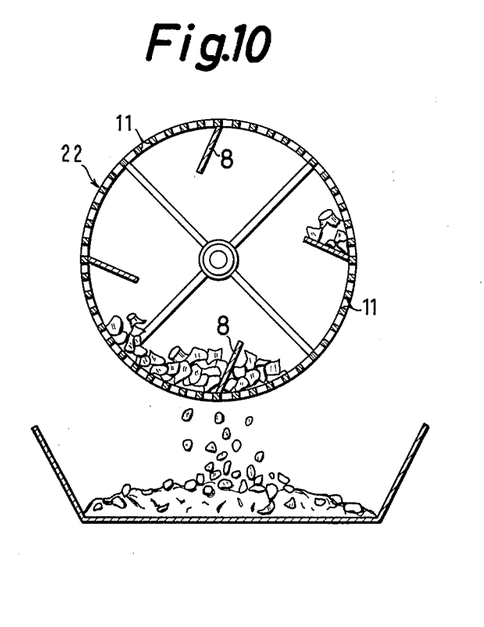
FIG. 10 is a cross sectional view of the same.

FIGS. 9 and 10 show an embodiment comprising a cylindrical grizzly 22 consisting of parallel iron bars 11 and scraper plates 8 attached to the inner surface of the grizzly. The grizzly 22 is rotatable about a shaft 9. The waste glass fed to the grizzly from an inlet 12 is raised by the scraper plates 8 and then dropped. By virtue of the rotation of the grizzly, the same breaking operation is repeated. Extraneous and oversize materials are discharged from an outlet 13. Accordingly the breaking operation can be carried out by a compact apparatus irrespective of the frequency of repetition, which is determined as desired.

Figure 11:
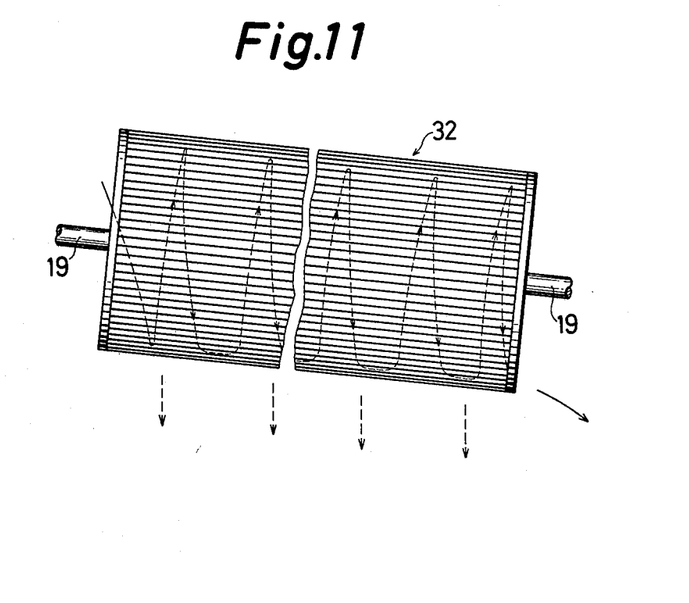
FIG. 11 is a side elevation showing another embodiment in the form of an inclined drum-shaped grizzly.
Figure 12:
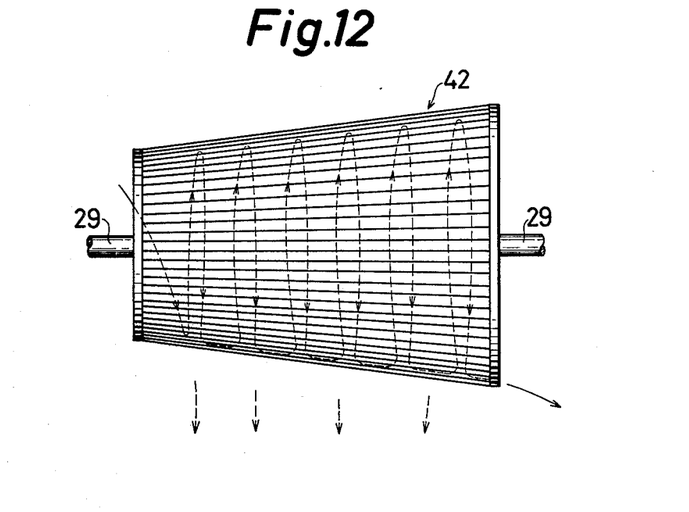
FIG. 12 is a side elevation showing another embodiment comprising a grizzly of the tapered drum type.
Figure 13:
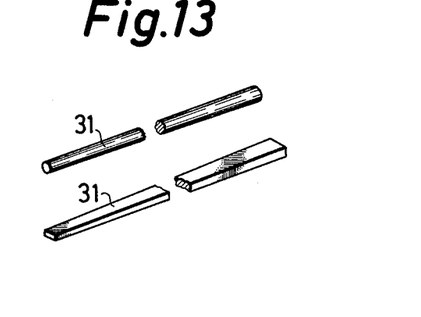
FIG. 13 is a perspective view partly broken away and showing bars used in the embodiment of FIG. 12.

FIG. 11 shows an inclined drum-shaped grizzly 32 supported on a rotatine shaft 19, and FIG. 12 a tapered drum-shaped grizzly 42 rotatable about a shaft 29. While the waste glass is being broken up repeatedly, the inclined grizzly surface causes the oversize portion of the glass to move in one direction and eventually discharges that portion. The tapered grizzly shown in FIG. 12 comprises tapered bars 31 such as those shown in FIG. 13 so that the space between the adjacent bars will be uniform in the longitudinal direction of the bars. When desired, the bar-to-bar spacing of the embodiments of FIGS. 11 and 12 may be varied at an intermediate portion or may be progressively varied.

Figure 14:
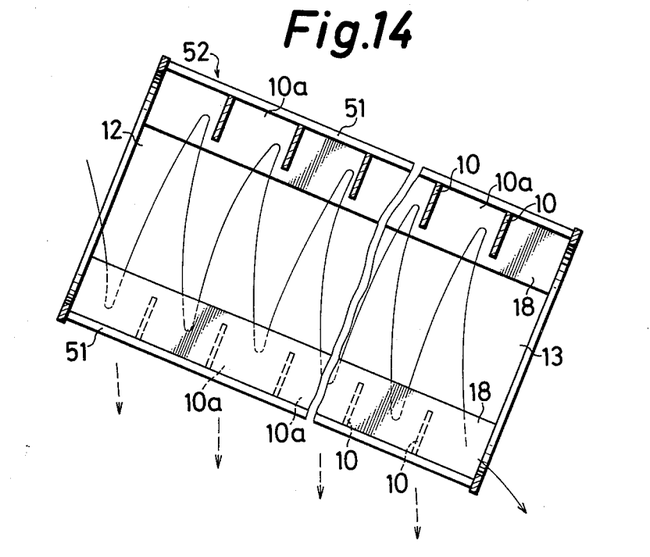
FIGS. 14 and 15 are a view in vertical section and a cross sectional view showing another embodiment.
Figure 15:
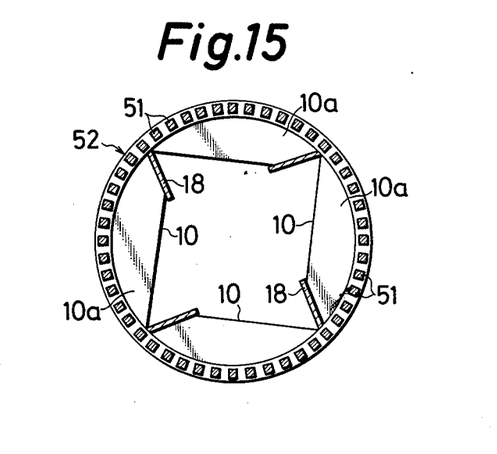

FIGS. 14 and 15 show an embodiment comprising an inclined cylindrical grizzly 52 consisting of iron bars 51 including scraper plates 18. On one side of each of the scraper plates 18, there is provided a partition 10 of an inclined height, whereby the interior of the grizzly 52 is divided into a plurality of compartments 10a arranged in the axial direction. The waste glass in one compartment 10a is dropped into the next compartment in succession, so that the relation between the frequency of dropping of the waste glass and the advance of the oversize portion can be regulated. The waste glass is dropped, at all times, onto the grizzly surface which is clear of the glass and is thereby effectively broken up. The embodiments shown in FIGS. 8 to 15 each have an inlet for waste glass and an outlet for the oversize material at the opposite ends of the grizzlies.

The drum-shaped grizzly may alternatively be provided on its outer periphery with guide rails and gears so as to render the grizzly rotatably supportable at the rail portions by means of rollers, with the gears adapted to drive the grizzly. In this case, the opposite end portions of the grizzly have no obstacles, so that inlet 13 and outlet 13 can be designed as desired to ensure facilitated feeding and discharging.

The spacing of the bars in the embodiments of FIGS. 8 and 9–15 is preferably designed to be 12 to 22 mm if bottle caps are to be removed. If only three-dimensional extraneous matter, such as cans, plastic bottles, etc., having the larger minimum width of projection, is to be removed, the bar spacing may be more than the above.

The spacing of the grizzlies in FIG. 8 and the diameter of the drum in FIGS. 9–15 are preferably so designed as to make falling heights 500 to 2,000 mm.

Figure 16:
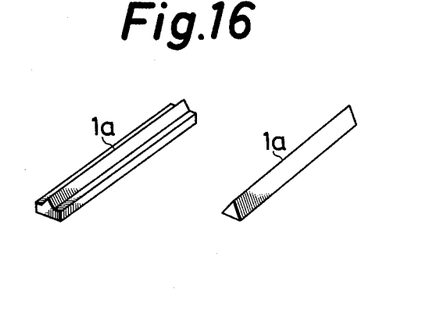
FIG. 16 is a perspective view showing modified bars.

If the bars 11 or 51 constituting the grizzly in the foregoing embodiments are so shaped as to have a ridge 1a on the top as illustrated in FIG. 16, concentric stress can be effectively produced in the waste glass, and increased breaking efficiency will result.

Figure 17:
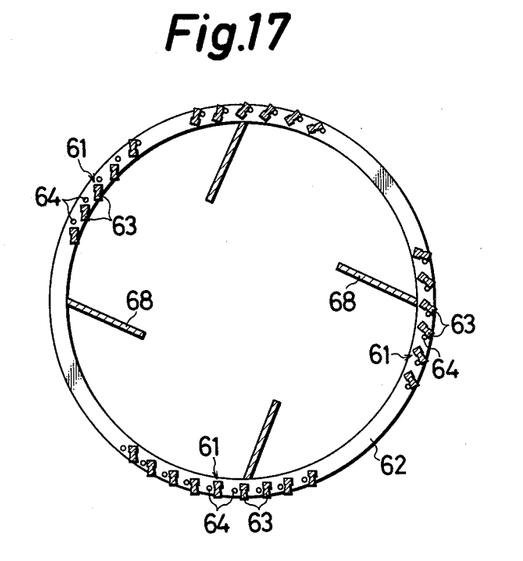
FIG. 17 is a cross sectional view and, FIGS. 18 and 19 are fragmentary enlarged views showing another embodiment.
Figure 18:
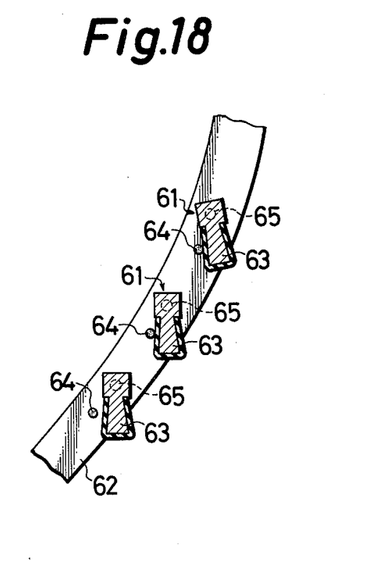
Figure 19:
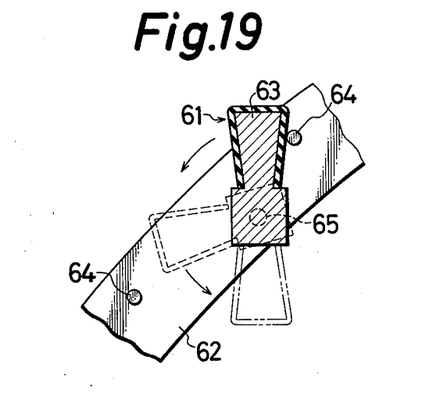

FIGS. 17 and 18 show another embodiment including bars 61 which are turnably supported by pivots 65 and provided with weight portions 63. Pins 61 restrict turning of the bars 61 relative to a support frame 62 to a specified range. As illustrated in FIG. 17, the bars 61 turn upside down in the upper part of the grizzly as they rise from a certain position of revolution, and in the course of downward revolving movement, they are returned to the original direction by the action of the weights 63 as illustrated in FIG. 19. If something blocks a space between the bars 61, it will be spontaneously released by the turning of the bars 61.

What is claimed is:

1. An apparatus for breaking up and separating waste glass to obtain cullet comprising grizzlies inclined and arranged in a multi-stage fashion within a passage for dropping the waste glass so as to provide between them falling heights sufficient to break the waste glass, each of the grizzlies being made up of parallel bars arranged at a spacing smaller than the minimum width of projection of the three-dimensional extraneous matter to be removed, each lower grizzly being so positioned as to receive an oversize portion of the waste glass falling by being guided by the higher grizzly positioned immediately thereabove without passing through the higher grizzly, an outlet for an oversize portion remaining on the lowermost grizzly being independent of an outlet for an undersize portion passing through each grizzly.

* * * * *